US012751421B2

(12) United States Patent
Sebugulu

(10) Patent No.: US 12,751,421 B2
(45) Date of Patent: Oct. 6, 2026

(54) PROGRAMMABLE ANIMAL FEEDER

(71) Applicant: Sentongo Sebugulu, Poughkeepsie, NY (US)

(72) Inventor: Sentongo Sebugulu, Poughkeepsie, NY (US)

( * ) Notice: Subject to any disclaimer, the term of this patent is extended or adjusted under 35 U.S.C. 154(b) by 0 days.

(21) Appl. No.: 19/365,783

(22) Filed: Oct. 22, 2025

(65) Prior Publication Data

US 2026/0114422 A1 Apr. 30, 2026

Related U.S. Application Data

(60) Provisional application No. 63/717,637, filed on Nov. 7, 2024, provisional application No. 63/713,929, filed on Oct. 30, 2024.

(51) Int. Cl.
*A01K 5/02* (2006.01)
*A01K 5/01* (2006.01)

(52) U.S. Cl.
CPC .............. *A01K 5/0291* (2013.01); *A01K 5/01* (2013.01)

(58) Field of Classification Search
CPC ...... A01K 5/0291; A01K 5/01; A01K 5/0114; A01K 5/02
See application file for complete search history.

(56) References Cited

U.S. PATENT DOCUMENTS 4,688,520 A * 8/1987 Parks .................. A01K 5/0275 119/51.5
4,722,300 A * 2/1988 Walker ................ A01K 5/0291 222/650
4,779,569 A * 10/1988 Lopez .................. A01K 5/0114 119/51.11
5,230,300 A * 7/1993 Mezhinsky .......... A01K 5/0275 119/51.11
5,363,805 A * 11/1994 Wing ................... A01K 5/0291 119/51.11
5,970,912 A * 10/1999 Supple ................. A01K 5/0291 119/51.11
6,196,158 B1 * 3/2001 Yang .................... A01K 5/0291 119/51.11

(Continued)

FOREIGN PATENT DOCUMENTS

CN 112119926 A 12/2020
CN 213281069 U 5/2021
EP 3 269 233 B1 8/2020

OTHER PUBLICATIONS

Auto Easy Feeder, Programmable Livestock Feeder, Arlington, TX, found: https://www.autoeasyfeeder.com on Jul. 18, 2024, 8 pages.

(Continued)

*Primary Examiner* — Trinh T Nguyen
(74) *Attorney, Agent, or Firm* — Saile Ackerman LLC; Stephen B Ackerman

(57) ABSTRACT

A programmable animal feeder is disclosed, to help dispense animal feed by using a motor control, and to help store the feed, by mounting the feeder on top of a feeding gate. A timer can be set for the feeder to open at a time the livestock need feeding and can be filled in the evening and set to open in the morning, and also filled in the morning and set to open in the evening. The animal feeder includes three release mechanisms that can be used to release the feed from a bucket: a wheel, a hydraulic system, or the use of a linear motion system.

10 Claims, 2 Drawing Sheets

(56) References Cited

U.S. PATENT DOCUMENTS

| | | | | |
|---|---|---|---|---|
| 6,227,143 | B1 * | 5/2001 | Papkov ................ | A01K 5/0291<br>222/650 |
| 7,798,098 | B1 | 9/2010 | Patterson | |
| 11,937,585 | B1 * | 3/2024 | Hughes ................ | A01K 5/0258 |

OTHER PUBLICATIONS

Hanen Automatic Cattle Feeders, found: https://automaticcattlefeeder.com/form.html, on Jul. 18, 2024, 10 pages.

* cited by examiner

PROGRAMMABLE ANIMAL FEEDER

This application claims the benefit of U.S. Provisional Patent Application Ser. No. 67/713,929, (FS24-001(PR)), filed on Oct. 30, 2024, which is herein incorporated by reference in its entirety. This application also claims the benefit of U.S. Provisional Patent Application Ser. No. 67/717,637, (FS24-002(PR)), filed on Nov. 7, 2024, which is herein incorporated by reference in its entirety.

BACKGROUND

Field

The present disclosure relates generally to a programmable animal feeder device for feeding livestock.

BACKGROUND

Current practice in the dairy and beef industry involves feeding cattle twice daily, requiring manpower and time to prepare the feed. The feed must be stored somewhere and manually dispensed. The time it takes to feed the livestock takes away from the time needed to milk the cattle and to do other chores.

SUMMARY

The present disclosure seeks to provide a programmable animal feeder, to help dispense animal feed by using a motor control, and to help store the feed, by mounting the feeder on top of a feeding gate.

Accordingly, it is an object of one or more embodiments of the present disclosure to provide a programmable animal feeder with a timer that can be set for the feeder to open at a time the livestock need feeding.

It is a further object of the disclosure to provide a programmable bucket feeder that can be filled in the evening and set with a timer to open in the morning. You can also fill the bucket feeder in the morning and set the timer to open in the evening.

The above and other objects of the present disclosure may be accomplished in the following manner. A programmable animal feeder is disclosed, for dispensing animal feed. The feeder includes a timer, for programming the feeder to open and close, a bucket for storing the animal feed, comprising a flat, slanted surface and a movable wall, which can be opened to release the feed. The feeder also includes a release mechanism configured to open the movable wall of the bucket, and a motor control attached to the release mechanism.

The objects of the disclosure are further achieved by providing a release mechanism including a wheel, a hydraulic system, or a linear motion system.

The object of this disclosure includes its variants, and its alternative embodiments, independently of its applications or processes it may be applied to.

BRIEF DESCRIPTION OF THE DRAWINGS

The present disclosure will be more clearly understood from the following description taken in conjunction with the accompanying drawings in which like reference numerals designate similar or corresponding elements, regions, and portions and in which.

DETAILED DESCRIPTION

The present disclosure discloses a programmable animal feeder, to dispense animal feed by using a motor control, and to help the feed, by mounting the feeder on top of a feeding gate. A timer can be set for the feeder to open at a time the livestock need feeding and can be filled in the evening and set to open in the morning, and also filled in the morning to open in the evening. The animal feeder includes three release mechanisms that can be used to release the feed from a bucket: a wheel, a hydraulic system, or the use of a linear motion system.

Figure 1A:
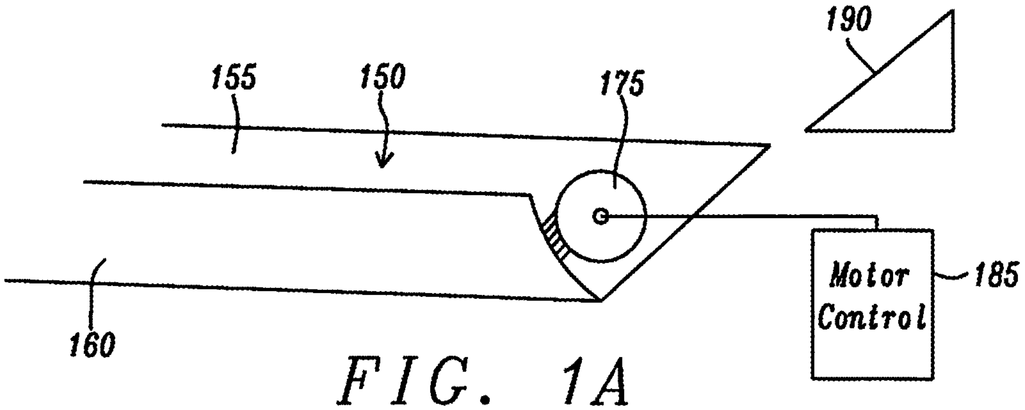
FIG. 1A shows a bucket, and a wheel configured inside the bucket, of a programmable animal feeder, in a first embodiment.
Figure 1B:
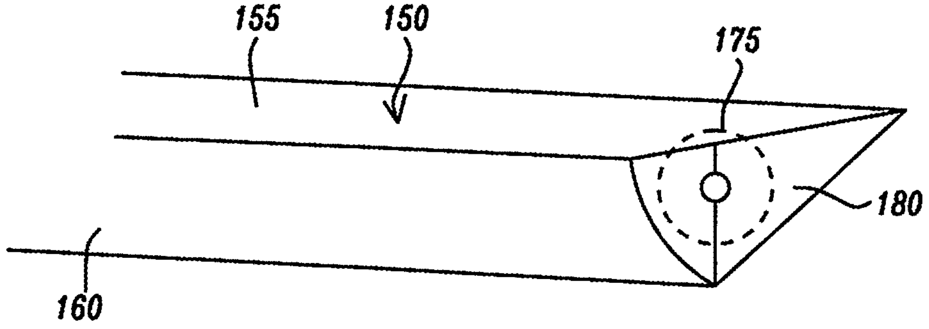
FIG. 1B shows an exterior end wall, configured at the side of the bucket, and used to contain feed inside, in the first embodiment.

FIG. 1A shows bucket 150 of the feeder, comprising a flat, slanted surface 155, and a movable wall 160, which can be opened to release the feed when programmed to do so. Wheel 175 is configured inside the bucket and is used to open the moveable wall with motor control 185, in a first embodiment. FIG. 1B shows exterior end wall 180, configured at the sides of the bucket, and used to contain feed inside. There are teeth on the wheel, and these teeth interlock with the teeth of the bucket, forcing the bucket to open once the timer is set. A bumper 190, for example, made of hard rubber, is used to attach the bucket to, for example, the top of the feeding gate.

Figure 2:
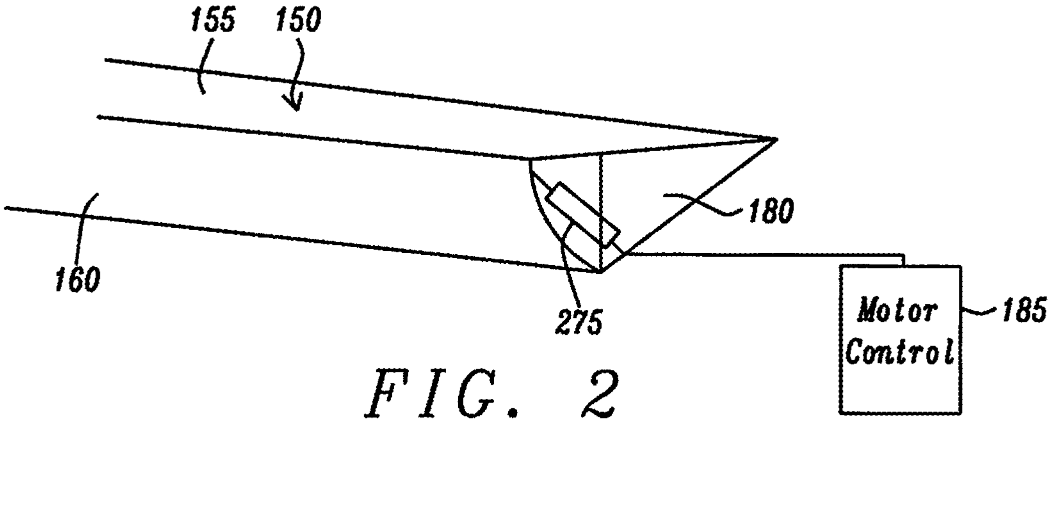
FIG. 2 shows a programmable animal feeder with a hydraulic system configured outside a bucket, in a second embodiment.

FIG. 2 shows bucket 150 of the bucket feeder, with movable wall 160, exterior end walls 180, and motor control 185. Hydraulic system 275 is configured outside the bucket and is used to open the moveable wall with the motor control 185, in a second embodiment. The hydraulics can be used to push open the bucket so that feed can be dropped into the bulk to the livestock from the feeder, when programmed to do so.

Figure 3:
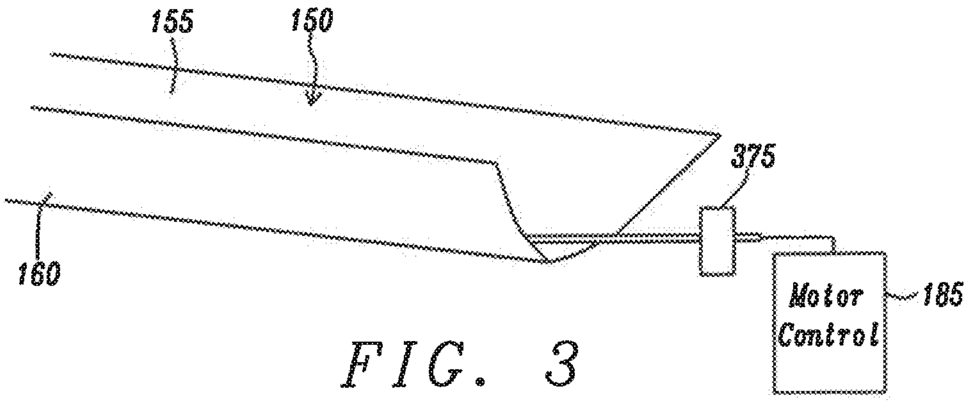
FIG. 3 shows a programmable animal feeder, with a linear motion system configured to open the bucket, in a third embodiment.

FIG. 3 shows bucket 150 of the animal feeder, with linear motion 375 configured to open the bucket, when programmed to do so, in a third embodiment. Inside linear motion 375, is a wheel with teeth that interlocks with the teeth of the linear motion. When motor control 185 is switched, movement of the wheel pushes the linear motion outward and opens movable wall 160.

Figure 4:
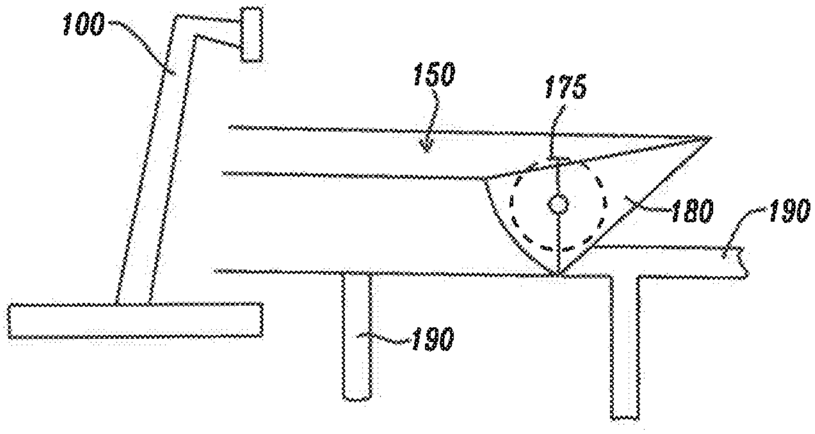
FIG. 4 shows an arm feeder, typically attached to a wheeled vehicle with a large amount of feed, used for loading feed into the bucket of the animal feeder.

FIG. 4 shows arm feeder 100, typically attached to a wheeled vehicle with a large amount of feed, used for loading feed into bucket 150 of the animal feeder. Typically, the vehicle is driven down rows of livestock to dispense the feed into buckets, where the armed feeder is part of a mixed feeder vehicle. Typically, the rows are, for example, 65' in width and 140'-340' in length. The mixed feeder vehicle delivers a constant and uniform supply of feed, achieving the correct dosage in the feeders. The opening of the discharge gate of the vehicle is powered hydraulically from the tractor.

The bucket feeder inside width from flat, slanted bucket 150 to movable wall 160 ranges from 35" to 44". The length depends on the amount of cattle in the pen and how long the size of the feedlot. Aluminium may be used in the construction of the bucket feeder, for example, ½" to 1" in size. The wheels may be increased to two on both sides, depending on the number of cattle. For example, any feedlot which houses 500 or more cattle may have two pairs of wheels on each side, with a hydraulic arm support in the middle of the bucket feeder to support the weight of the feed. This applies to both the hydraulic and linear motion systems.

The programmable animal feeder can be mounted on top of the feeding gate for more support, and if the amount of feed is too heavy for the bucket, it can be supported by putting more wheels, hydraulics, or linear motion systems inside the bucket feeder. Some materials used in the construction of the feeder may include aluminum, steel, and hard rubber. A typical bucket feeder consists of wheels, hydraulics, linear motion, movable walls, a flat slanted surface, a release mechanism configured to open the movable wall, and a timer.

The main advantage of one or more embodiments of the present disclosure includes providing a programmable animal feeder to conserve manpower and time. The feeder helps store the feed, by mounting the feeder on top of a feeding gate, and helps dispense the feed, by using a motor control. A timer can be set for the feeder to open at a time the livestock need feeding. The savings in manpower used to feed the livestock can be turned into doing other chores, thereby providing consistency in feeding and reducing overall labor costs, and saving fuel attributed to the required feedings. The feeder can provide the cattle's recommended twice daily feeding. The programmable animal feeder can take care of feeding the animals, while freeing up time, talents, and finances needed for other farming areas.

While particular embodiments of the present disclosure have been illustrated and described, it will be understood by those skilled in the art that various changes in form and details may be made without departing from the spirit and scope of the invention.

What is claimed is:

1. A programmable animal feeder, for dispensing animal feed, comprising:

a timer, for programming the feeder to open and close;

a bucket, wherein the bucket stores the animal feed, and is mounted on top of a feeding gate, a flat, slanted surface and a movable wall, which can be opened to release the feed;

a release mechanism configured to open the movable wall of the bucket; and a motor control attached to the release mechanism, wherein the release mechanism comprises a wheel, a hydraulic system, or the use of a linear motion system.

2. The programmable animal feeder of claim 1, wherein the wheel is configured inside the bucket and is used to open the moveable wall with the motor control.

3. The programmable animal feeder of claim 1, wherein the wheel comprises teeth, and the teeth are configured to interlock with teeth of the bucket, forcing the bucket to open once the timer is set.

4. The programmable animal feeder of claim 1, wherein the hydraulic system is configured outside the bucket and is used to open the moveable wall with the motor control.

5. The programmable animal feeder of claim 1, wherein the linear motion system is configured to open the bucket, when programmed to do so.

6. The programmable animal feeder of claim 1, further comprising an exterior end wall, configured at the sides of the bucket, used to contain the animal feed inside the bucket.

7. The programmable animal feeder of claim 1, further comprising a bumper, configured to attach the bucket to the top of the feeding gate.

8. The programmable animal feeder of claim 1, further comprising an arm feeder attached to a wheeled vehicle, used for loading feed into the bucket.

9. The programmable animal feeder of claim 1, further comprising additional wheels, hydraulics, or linear motion systems inside the bucket.

10. The programmable animal feeder of claim 1, wherein materials used in the construction of the feeder include aluminum, steel, and hard rubber.

* * * * *